Oct. 25, 1927. C. CHISHOLM Re. 16,777

CHANGEABLE PRINTING FORM

Original Filed July 11, 1924

INVENTOR
Clifton Chisholm
By Baker, Maxham, Jaeger & Vaughan,
ATTORNEYS

Reissued Oct. 25, 1927. Re. 16,777

UNITED STATES PATENT OFFICE.

CLIFTON CHISHOLM, OF CLEVELAND, OHIO, ASSIGNOR TO THE AMERICAN MULTIGRAPH COMPANY, OF CLEVELAND, OHIO, A CORPORATION OF OHIO.

CHANGEABLE PRINTING FORM.

Original No. 1,560,211, dated November 3, 1925, Serial No. 725,369, filed July 11, 1924. Application for reissue filed May 5, 1927. Serial No. 189,152.

This invention relates to a printing form wherein one part is relatively permanent for many impressions and another part is periodically changed, as, for instance, in an addressing machine. One object of the invention is to combine means for printing the body of a form by rows of individual type with means for printing the changeable portion by embossed character strips held parallel with the type rows and arranged to stand at the same printing height.

Another object is to provide a simple and inexpensive device which may be mounted on the carrier for the general form and enable the ready interchange of the members printing the changeable portion.

A more particular embodiment of this invention is in connection with a multigraph having a rotary drum on which are mounted rows of type. My removable insert is adapted for ready mounting on such railed drum and adds to the type form a few lines adapted to printing in conjunction therewith, but readily changed without disturbing the type on the drum.

More specifically my removable insert comprises a plate having means on its under side adapted to extend between the T-rails of a multigraph machine and underhang the heads thereof, and having means for carrying on its upper side a removable printing member.

The invention hereinafter is more fully explained in connection with the drawings and the essential novel characteristics are summarized in the claims.

Figure 1:
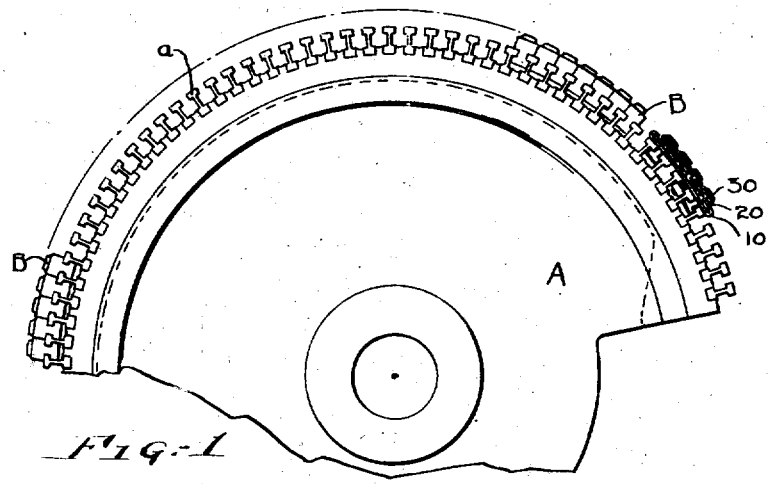
Figure 2:
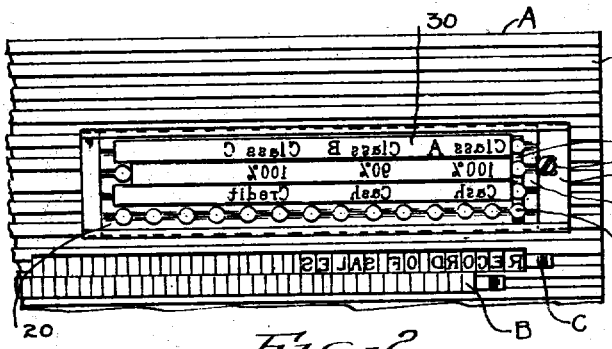
Figure 3:
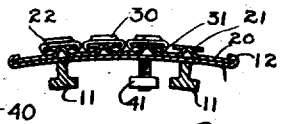
Figure 4:
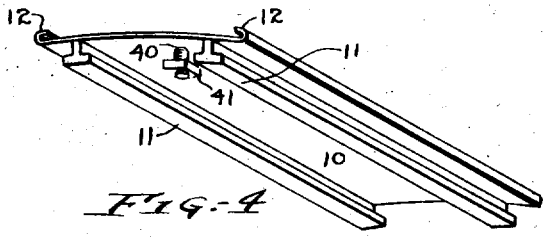
Figure 5:
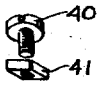

In the drawings, Fig. 1 is an end elevation, partly broken away, of a multigraph drum, equipped with rows of individual type and my removable insert; Fig. 2 is a fragmentary plan of such drum so equipped; Fig. 3 is a cross section through the removable insert device; Fig. 4 is a perspective of the holder member of the removable insert, which is directly mounted on the drum; Fig. 5 is a perspective of the lock for the holder.

In Figs. 1 and 2, A indicates a multigraph drum having about its periphery parallel rails *a* with overhanging edges. B indicates short type grooved on its opposite sides and adapted to be slid endwise of the rails into the space between them, such type being retained in place by the overhanging heads of the rails, and, if desired, prevented from laterally shifting by stop plugs or clips, C (Fig. 2) mounted in the channels.

The parts described constitute usual multigraph equipment with which my removable insert is designed to cooperate.

My removable insert, in its preferred form, comprises a sheet metal holder plate having upwardly and inwardly curled parallel edge flanges and a plate carrying embossed characters which is adapted to be slid readily into and out of place in the holder. The holder and its removable printing member are of such combined thickness that the printing characters stand at the same radial distance from the axis of the drum as the face of the type B.

The holder for the removable insert, designated 10, comprises a plate having on its underside means for holding it on the drum and on its upperside means for holding the changeable printing device. As shown in Figs. 3 and 4, the holder plate 10 has on its underside longitudinal rails 11 which are of inverted T-shape in cross-section. These rails may be welded or otherwise secured to the plate 10. This plate has its edges curled under upwardly and inwardly to provide the hooked flanges 12. Such a holder may be readily mounted on the multigraph drum by being slid lengthwise thereof, the rails 11 being so positioned on the plate 10 that they register with channels between some of the rails *a* on the drum.

I prefer to employ as the changeable printing member a thin sheet metal carrier plate which has upwardly stamped projections on which are mounted flanged strips embossed with the printing characters. As shown more particularly in Fig. 3, this carrier plate 20 has parallel rows of upwardly projecting buttons 21 stamped up from the plate and connected with it in direction of the row, but disconnected at the edges, which project freely toward adjacent rows. Such a plate is shown, described, and claimed in the patent to W. J. Deming, No. 1,438,584 issued December 12th, 1922, to The American Multigraph Company. In addition to the stamped up buttons, the plate preferably has also upstanding corrugations 22 between the buttons, which act to stiffen the plate and with the buttons provide a continuous support for the embossed strips.

This feature is covered in Patent No. 1,438,-582 of B. J. Craig, issued December 12th, 1922, to The American Multigraph Company.

The embossed strips are designated 30 in Figs. 1, 2 and 3. Each strip is a metal member having printing characters on it embossed upwardly from the underside of the strip. The edges of the strip are curled or flanged downwardly and inwardly as shown in 31. Such an embossed strip may be slid endwise over the row of buttons and be retained thereon by reason of the flanges on the strip underhanging the arcuate projecting edges of the buttons.

Simple means may be employed to present the embossed strips shifting longitudinally on the plate 20. This may be effected by the simple expedient of making an inward dent by prick punch on some blank space on the strip. If desired, I may form an abutment for these strips at one end by inserting a flat flexible strip of metal transversely of the rows through the space beneath aligned buttons. Such an abutment strip is shown at 23 in Fig. 2 and is claimed in my co-pending application No. 673,413, filed November 8th, 1923.

It will be seen that the embossed strips, made by some suitable machine, may be quickly mounted and secured on the plate 20. Likewise, such plate with the strips may be quickly mounted in the holder 10 and the holder 10 may be quickly mounted on the multigraph drum.

If desired, the holder may be prevented from shifting laterally on the drum by the use of the usual plugs or clips such as shown at C for locking the type lines. However, I regarded it preferable to provide a special lock on the holder 10. I have shown such lock in the fom of a screw 40, the shank of which passes through a hole in the holder, and a nut 41 threaded thereon and occupying one of the channels of the drum and prevented from rotating by engagement with the side walls of adjacent rails of the drum. Such screw is so located in the plate 10 that the nut aligns with one of the channels when the rails 11 aligns with other channels and such holder is slid into place on the drum, when the screw is turned by a screw driver, the holder becomes clamped to the drum. The head of the screw performs another function, forming an abutment for the plate 20. Accordingly, by properly positioning the holder on the drum, the plate shoved lengthwise against the screw head comes into the proper position to have the embossed strips held by the positioning strip 23 in proper registration with the rest of the form on the drum.

I have found it usually sufficient to lock the holder in position and use the head of the screw 40 as an abutment for the plate, the latter fitting the overhanging edges 12 of the holder with sufficient snugness so that it does not become displaced in operation of the machine. However, if desired, a suitable clip may be inserted in one of the channels at the other end of the holder and bear against that end of the plate and thus positively prevent its shifting in that direction.

It will be noted that the removable insert as described is adapted for mounting on a railed member whether the latter be a rotary drum or a flat bed. If the device is used on a flat bed the holder plate 10 is made flat and both rails 11 have their webs vertical. When the holder is intended for mounting on a drum the plate 10 is preferably curved concentrically of the drum surface and the rails 11 are positioned radially thereon, as shown in Figs. 3 and 4.

If the printing member comprises the plate 20 with removable embossed strips 30, which is my preferred form, it will be seen that the same plate may be used over and over again with different embossed lines thereon. In such case the ordinary equipment for this attachment may well comprise one holder 10, several plates 20 and the requisite embossed lines, these embossed lines to be made up according to the different matter to be inserted and mounted on different plates 20 when the body of the form is on the drum and the holder locked in place in proper position with relation thereto, one plate 20 with its embossed strips may be slid into place in the holder and the desired number of copies run off, the machine stopped, and the plate 20 with its strips slid out and another plate with strips substituted. The plates and strips occupy a small space and may be stored in assembled condition for subsequent use, or the embossed strips may be removed and others mounted on the plate, according to the nature of the printing operation.

It will be seen that my invention provides a simple device for enabling composite forms to be made, comprising type and embossed material all standing at the same printing height. This is true whether the changeable printing member comprises a stamped plate with separate embossed strips thereon or is otherwise constructed.

I claim:

1. The combination with a railed member, grooved type mounted in rows thereon, a holder mounted on same member, a plate slidably mounted on the holder and embossed printing strips mounted on the plate, said type and printing strips having their faces the same printing height.

2. The combination of a railed segment and grooved type mounted between said rails and held by them, a holder mounted on some of said rails, and a carrier plate having embossed printing characters and slidably mounted on said holder and having the face of its characters at the same radial distance as the type.

3. The combination of a member having parallel rails with overhanging edges of a holder mounted thereon and having two portions projecting from its underside extending into the space between pairs of adjacent rails, and a removable printing device slidably mounted on said holder.

4. The combination of a drum having parallel radial rails with overhanging edges, a holder having on its underside underhang-rails adapted to slide longitudinally into channels between pairs of adjacent rails on the drum, said holder having its side edges bent upwardly and inwardly, and a metallic printing device thin at its edges, which are adapted to slide beneath said underturned edges of the holder.

5. The combination of a holder having a downwardly extending holding device whereby it may be mounted in a printing machine and an upwardly extending retaining device, a plate adapted to be mounted on the holder by means of said retaining device, and a plurality of independent embossed printing strips mounted side by side on said plate.

6. The combination of a holder having downwardly extended means for holding it on a printing machine, and an upwardly extending retaining device, a plate adapted to be mounted on the holder by means of said retaining device and having upwardly extending overhanging projections, and printing strips mounted on said projections.

7. The combination of a holder having on its underside a pair of downwardly projecting underhanging members, whereby the holder may be mounted and retained on a member having parallel rails with underhanging edges, a plate, means for holding such plate on the holder, and printing members mounted on the plate.

8. A holder having a pair of parallel rails upon its underside with projecting edges, and having means on its upperside for removably holding a plate in combination with such plate and embossed printing strips removably mounted on the plate.

9. A combination of a holder having laterally projecting members on its underside to hold it on a railed member, the edges of said holder being flanged upwardly and inwardly, a plate on the holder removably retained by said flanges, and printing members removably mounted on the plate.

10. The combination of a holder comprising a plate having on its underside two parallel rails with ledges adjacent their bottoms, said plate having its edges curled upwardly and inwardly, a plate mounted on the upperside of the holder and having its edges embraced by curled edges, the last mentioned plate having upwardly extending overhanging projections, and embossed printing strips having inwardly flanged edges overlying said projections and held thereon.

11. The combination with a member having parallel rails with overhanging edges, of a holder mounted thereon, and having two portions projecting from its underside extending into the space between pairs of adjacent rails, a plate mounted on the holder, and printing members mounted on the plate.

12. The combination, with a member having parallel rails with overhanging edges, of a holder mounted thereon, and having two portions projecting from its underside extending into the space between pairs of adjacent rails, a plate mounted on the holder and having upwardly extending projections, and embossed printing strips mounted on the plate by means of said projections.

13. The combination with a drum having parallel radial rails with overhanging edges, a holder comprising a curved plate, mounted on the rails and held thereto by means extending into channels between rails, a plate mounted on the holder, and printing members mounted on the plate.

14. The combination with a drum having parallel radial rails with overhanging edges, a holder having on its underside underhanging rails adapted to slide longitudinally into channels between pairs of adjacent rails on the drum, said holder having means for retaining a plate thereon, a plate so mounted on the holder, said plate having upwardly projections and embossed printing strips mounted on said plate.

15. The combination with a printing machine, of a holder adapted to be slid into place thereon, a lock carried by the holder and engaging the printing machine to prevent the shifting of the holder, and a printing device slidably mounted on the holder.

16. The combination with a printing machine, of a holder adapted to be slid into place thereon, a lock carried by the holder and engaging the printing machine to prevent the shifting of the holder, a plate mounted on the holder, and printing strips mounted on the plate.

17. A holder comprising a plate having on its underside downwardly and laterally projecting members adapted to enter a channel of a printing machine provided with overhanging rails, a screw and nut couple mounted on the holder, one member of which may occupy a channel between rails and be held from rotation thereby, the other of which is accessible above the holder, and a printing device mounted on the holder.

18. The combination of a holder having means for mounting it on a railed member of a printing machine, a screw and nut couple mounted on the holder, one member of which may occupy a channel between rails and be held from rotation thereby and the other of which is accessible above the holder, and a printing device mounted on the holder and abutting the top member of said couple.

19. The combination of a holder having on its underside a pair of parallel rails with projecting ledges, the edges of the holder being curled inwardly at the top, said holder being adapted to be slid into position on the railed member of a printing machine with said ledges underhanging the edges of the rails, a screw projecting through the holder and located so as to engage a channel between rails when the downward members on the holder occupy other channels, a nut on the screw adapted to occupy one of the channels, and be held thereby against rotation, a plate mounted on the holder with its edges embraced by said flanges and its end adapted to abut the head of the screw, and embossed strips mounted on the plate.

20. A changeable printing form comprising parallel rows of individual type for the permanent part of the form, a plurality of separate embossed printing strips side by side on a holder for the changeable part, and means for holding said holder so that said strips are parallel with said rows and at the same printing height.

21. The combination with a railed segment, grooved individual type mounted in rows thereon, a holder mounted on the same and a carrier on which are mounted a plurality of independent strips, said carrier being held on the segment in a manner enabling it to be readily removed with its strips, said type and printing characters having their faces the same radial distance from the axis of the segment.

22. The combination with a railed member, of a holder having laterally projecting members on its underside interlocking with rails of said member to hold it on a railed member, the edge of said holder being flanged upwardly and inwardly and a metallic printing device slidably mounted on said holder and retained by said flanges.

23. The combination with a member having rails with overhanging edges, of a holder comprising a plate having on its underside two parallel rails with ledges adjacent their bottoms, the rails of the holder interlocking with rails of the member, said plate having its edges curled upwardly and inwardly, a plate mounted on the upper side of the holder and having its edges embraced by said curled edges and embossed printing characters supported by said plate.

Signed at Cleveland, Ohio, this 4th day of May, 1927.

CLIFTON CHISHOLM.